US009442924B2

(12) United States Patent
Lui et al.

(10) Patent No.: US 9,442,924 B2
(45) Date of Patent: Sep. 13, 2016

(54) LOCALIZATION FRAMEWORK FOR DYNAMIC TEXT

(71) Applicant: Zynga Inc., San Francisco, CA (US)

(72) Inventors: Bigi Lui, Hayward, CA (US); Danica Milosevic Brinton, Oakland, CA (US); Eric Matsumura, Fairfield, CA (US); John Huan Vu, San Jose, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 14/974,768

(22) Filed: Dec. 18, 2015

(65) Prior Publication Data

US 2016/0103826 A1  Apr. 14, 2016

Related U.S. Application Data

(63) Continuation of application No. 13/348,542, filed on Jan. 11, 2012, now Pat. No. 9,244,902.

(60) Provisional application No. 61/549,553, filed on Oct. 20, 2011.

(51) Int. Cl.
*G06F 17/27* (2006.01)
*G06F 17/28* (2006.01)
*G06F 17/24* (2006.01)

(52) U.S. Cl.
CPC ............ *G06F 17/289* (2013.01); *G06F 17/24* (2013.01); *G06F 17/2705* (2013.01); *G06F 17/277* (2013.01); *G06F 17/2836* (2013.01)

(58) Field of Classification Search
CPC .......................... G06F 17/2836; G06F 17/289
See application file for complete search history.

(56) References Cited

U.S. PATENT DOCUMENTS

| | | | |
|---|---|---|---|
| 5,497,319 A | 3/1996 | Chong et al. | |
| 5,550,934 A | 8/1996 | Van Vliembergen et al. | |
| 5,583,761 A * | 12/1996 | Chou | G06F 9/4448 704/2 |
| 6,094,671 A | 7/2000 | Chase et al. | |
| 6,470,306 B1 | 10/2002 | Pringle et al. | |
| 6,842,730 B1 | 1/2005 | Ejerhed et al. | |
| 7,020,601 B1 * | 3/2006 | Hummel | G06F 17/278 704/1 |
| 7,027,975 B1 | 4/2006 | Pazandak et al. | |
| 7,356,458 B1 | 4/2008 | Gonos | |
| 2002/0119810 A1 * | 8/2002 | Takatsuka | A63F 13/10 463/7 |
| 2003/0215067 A1 | 11/2003 | Ordille et al. | |
| 2004/0015504 A1 | 1/2004 | Ahad et al. | |
| 2004/0088155 A1 | 5/2004 | Kerr et al. | |
| 2005/0187644 A1 * | 8/2005 | Neale | G07F 17/3232 700/91 |
| 2005/0192095 A1 * | 9/2005 | Cheng | G06F 17/2836 463/35 |
| 2006/0206303 A1 | 9/2006 | Kohlmeier et al. | |
| 2008/0046231 A1 * | 2/2008 | Laden | G06F 17/248 704/8 |

(Continued)

OTHER PUBLICATIONS

"U.S. Appl. No. 13/348,542, Non Final Office Action mailed Mar. 20, 2015", 63 pgs.

(Continued)

*Primary Examiner* — Eric Yen
(74) *Attorney, Agent, or Firm* — Schwegman Lundberg & Woessner, P.A.

(57) ABSTRACT

An apparatus and method providing a localization framework capable of localizing dynamic text is disclosed herein. The localization framework is configured to automatically identify and prioritize certain text contained within an application code base to be translated. Such text is preprocessed prior to translation to facilitate accurate and complete translation in a target language.

20 Claims, 5 Drawing Sheets

(56) References Cited

U.S. PATENT DOCUMENTS

| | | |
|---|---|---|
| 2008/0162114 A1 | 7/2008 | Torres-Rocca et al. |
| 2008/0215309 A1* | 9/2008 | Weischedel ......... G06F 17/2229 704/3 |
| 2008/0256096 A1 | 10/2008 | Nuthakki et al. |
| 2009/0086601 A1 | 4/2009 | Mcclellan et al. |
| 2009/0094609 A1 | 4/2009 | Burukhin et al. |
| 2009/0113445 A1* | 4/2009 | Sakashita ............ G06F 17/2827 719/313 |
| 2009/0138255 A1 | 5/2009 | Sterling et al. |
| 2009/0198487 A1* | 8/2009 | Wong ..................... G06F 17/28 704/4 |
| 2009/0307584 A1 | 12/2009 | Davidson et al. |
| 2009/0327925 A1 | 12/2009 | Smet |
| 2010/0057760 A1 | 3/2010 | Demant et al. |
| 2012/0016678 A1* | 1/2012 | Gruber ................ G06F 17/3087 704/275 |
| 2012/0072201 A1 | 3/2012 | Chen et al. |
| 2013/0030787 A1* | 1/2013 | Cancedda ........... G06F 17/2881 704/2 |
| 2013/0144592 A1* | 6/2013 | Och ....................... G06F 17/28 704/2 |
| 2013/0144596 A1 | 6/2013 | Lui et al. |

OTHER PUBLICATIONS

"U.S. Appl. No. 13/348,542, Notice of Allowance mailed Sep. 18, 2015", 16 pgs.

"U.S. Appl. No. 13/348,542, Response filed Jul. 20, 2015 to Non Final Office Action mailed Mar. 20, 2015", 19 pgs.

"GitHub", [Online]. Retrieved from the Internet: <URL: github.com/facebook/scribe>, (Accessed Oct. 9, 2013), 3 pgs.

"GNU Operating System—gettext", [Online], Retrieved from the Internet: <URL: www.gnu.org/software/gettext>, (Accessed Oct. 9, 2013), 2 pgs.

* cited by examiner

LOCALIZATION FRAMEWORK FOR DYNAMIC TEXT

CROSS-REFERENCE TO RELATED APPLICATIONS

This application is a continuation of U.S. patent application Ser. No. 13/348,542, filed on Jan. 11, 2012, which claims priority to U.S. Provisional Patent Application No. 61/549,553 filed Oct. 20, 2011, the benefit of priority of each of which is claimed hereby, and each of which is incorporated by reference herein in its entirety.

TECHNICAL FIELD

The present disclosure relates to application frameworks in general, and in particular embodiments, to application localization frameworks.

BACKGROUND

Computer software or applications that interact with users often displays graphical information, including text, to facilitate the interaction. The code responsible for generating text in such an application includes specification of text strings, e.g., specifying the exact text to be displayed to the user. The text strings are typically authored in a human language, such as English. When the application will be deployed to non-English speaking users, the application is typically not rewritten in its entirety. Instead, the application is adapted to a new human language, taking into account regional differences and other particularities of the new language. For example, Spanish has gender-specific grammar not found in English. The English language text strings in the application may be translated to the new language so that the displayed text appears "local" or native to the new group of users. This process of adapting an application to different human languages is known as "localization."

Localization of an application is typically a separate process from application development or original authoring of the application. This is also true for localization of application updates over time. Localization tends to be a separate task for a number of reasons. For one thing, it may not be apparent during application development or original authoring of the application whether the application will be marketed in more than one country or necessarily in which countries. Due to this uncertainty, there is little incentive to initially code text strings included in the application in more than one language. Additionally, localization tends to be a complex, time consuming, and manual process. It would be better for developers to direct their efforts toward application development and original authoring of the application rather than on ancillary tasks such as localization.

Localization of an application typically occurs during runtime, and more particularly, on an as-needed basis, based on the particular interaction with a user. If, for example, the user interacts with the application in such a way that only non-textual information is presented to the user, then localization may not be necessary since the displayed information is not language-specific. On the other hand, if the user interacts with the same application in such a way that textual information must be presented to the user, then localization permits the particular textual information to be displayed to be properly translated text so as to be understandable by the user. Text strings within the application are identified and translated by human translators ahead of time; such translations are then accessed, as needed, during localization for display to the user.

Given the complexity of localizing even a single instance of an application, the complexity can be exponential when the application provides a large amount of textual information to each user, there are a large number of instances of the application running at the same time, the application supports multiple languages, there are frequent updates to the application, the application is being pre-processed to localize for the first time in a new language, and/or the number of users is ever increasing.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the claimed invention.

DETAILED DESCRIPTION

The following description is presented to enable any person skilled in the art to create and use a computer system configuration and related method and article of manufacture to continually and intelligently localize applications. In some embodiments, a localization framework is configured to handle legacy application code base, dynamic text contained within an application code base, and which automatically identifies the currently used portions of an application code base based on user page visits, thereby providing prioritization for efficient translation workload. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
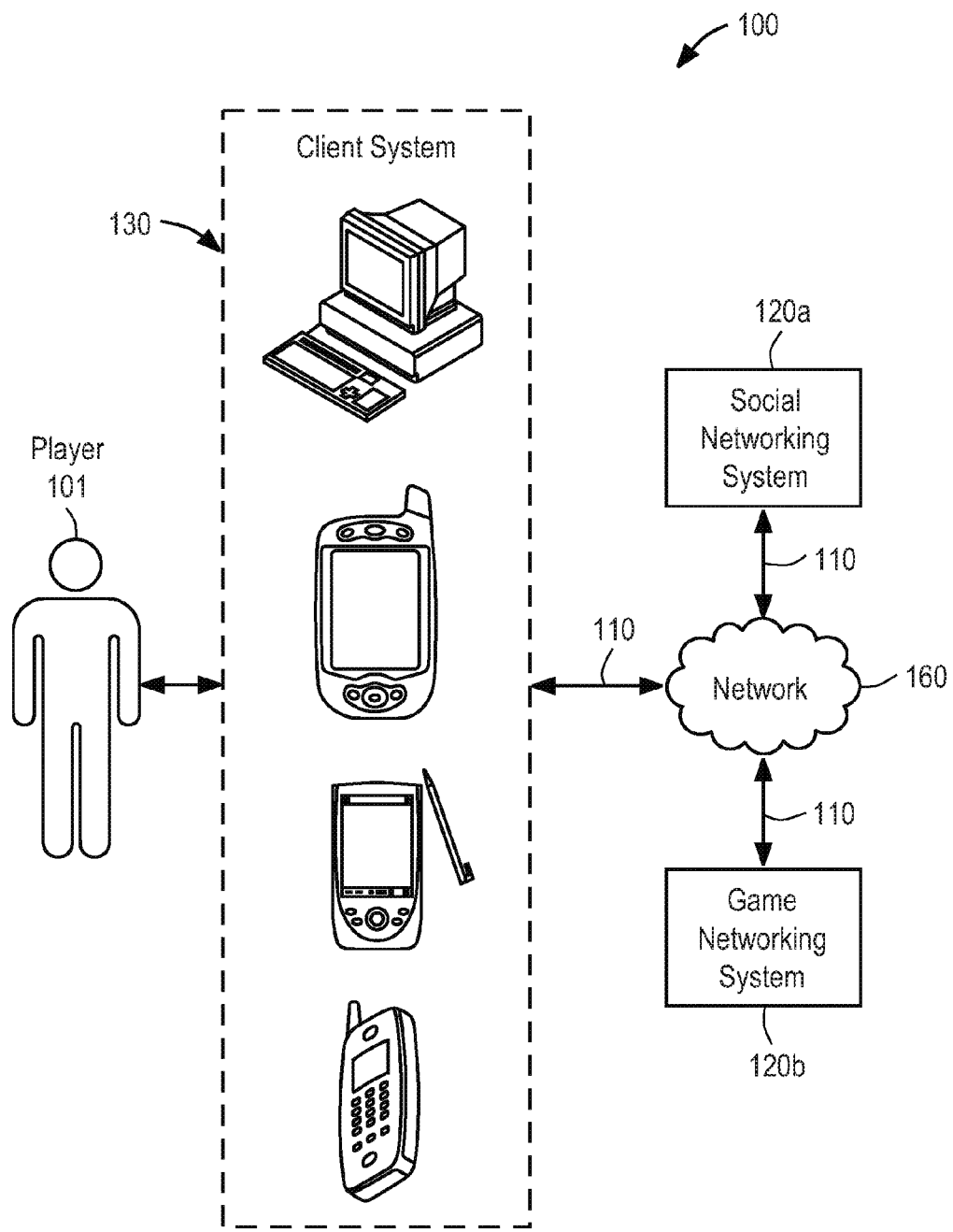
FIG. 1 illustrates an exemplary system for implementing various disclosed embodiments of a localization framework.

FIG. 1 illustrates an exemplary system 100 for implementing various disclosed embodiments. In particular embodiments, system 100 comprises player or user 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as Digital Subscriber Line (DSL) or Data Over Cable Service interface Specification (DOCSIS)), wireless (such as Wi-Fi or Worldwide interoperability for Microwave Access (WiMAX)), or optical (such as Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (for example, by typing on the keyboard or clicking the mouse of client system 130), the client components of the game may transmit the player's input to game networking system 120b.

Although FIG. 1 is described in the context of online games, it should be understood that the invention is not so limited. Instead, embodiments of the localization framework discussed herein apply to any computer software, application, program, computer executable code, computer executable instructions, modules, functions, and the like configured for a variety of industries or purposes (e.g., gaming, finance, business, education, training, accounting, personal productivity, etc.) that may provide textual information to a user, in which the textual information to be displayed is desirable to be in a different language from that provided in the original coded text string(s) corresponding to the textual information to be displayed.

Figure 2:
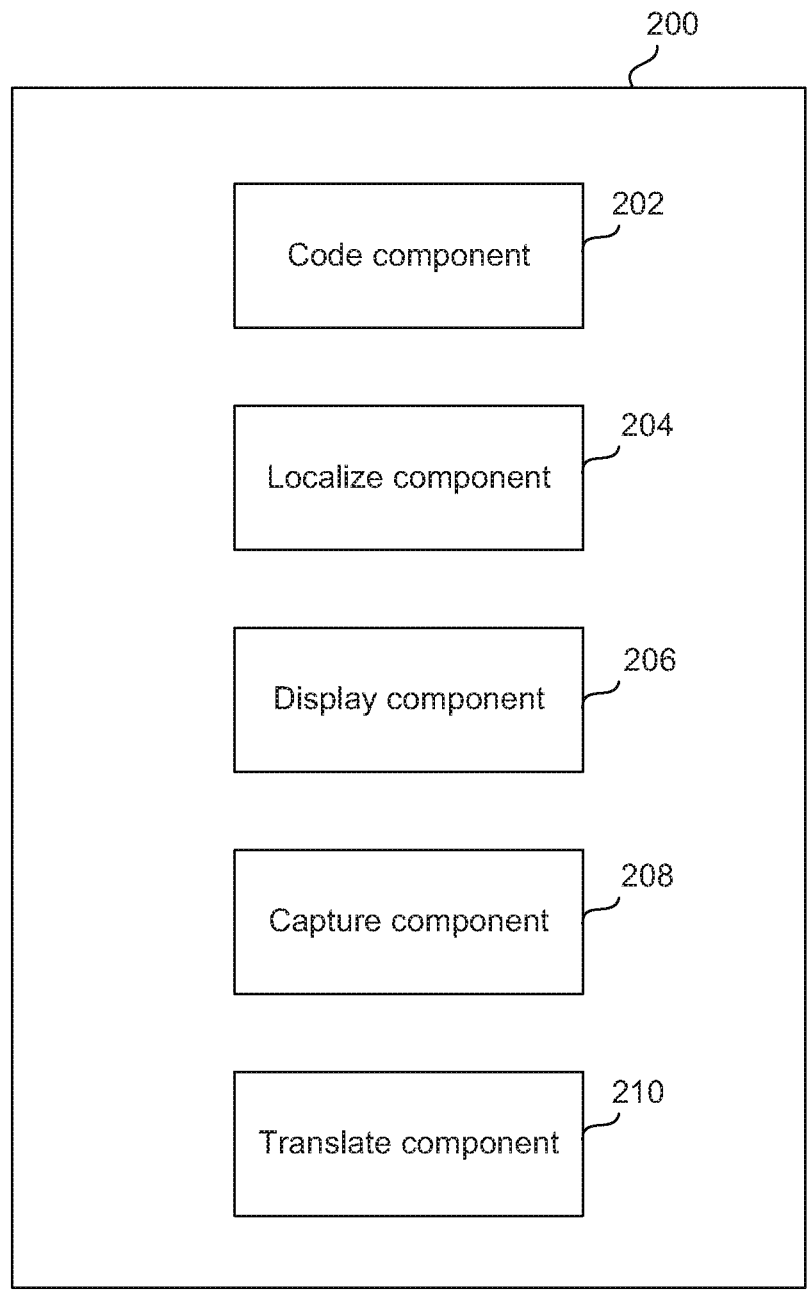
FIG. 2 illustrates a localization framework according to some embodiments.

FIG. 2 illustrates a localization framework 200 according to some embodiments. Localization framework 200 represents a schema for carrying out localization of an application or computer software. Localization framework 200 may be included in social networking system 120a, game networking system 120b, or another server (not shown in FIG. 1). Localization framework 200 comprises a code component 202, a localize component 204, a display component 206, a capture component 208, and a translate component 210.

Under localization framework 200, developers code or author an application as they normally would (code component 202). This includes coding application updates. Next, when a user (e.g., player 101) accesses the application and user interaction prompts the application to display textual information to the user, the textual information to be displayed, as specified by text string(s) within the application code, is converted from the coded language (e.g., English) to another language appropriate for the user (e.g., Spanish) (localize component 204).

Due to the cumulative and iterative nature of localization framework 200, the first time a particular text string is localized in a particular language (that is not the originally coded language), the conversion is incomplete. The textual information displayed to the user is in the originally coded language (a default text language, such as English, rather than in Spanish) (display component 206). On the other hand, if a user (the same or different user from the present user) previously caused an application to display the same particular text in the same particular language, then conversion can be completed for subsequent displays of that text.

When a particular text string is localized for the first time in a particular language, localization framework 200 includes capture component 208 to identify and "capture" that text string for translation. The "captured" text string is then readied and sent for translation (translate component 210). Consequently, the next time that text string is accessed for display in the translated language, localize component 204 is able to appropriately convert the text string.

Localization framework 200, described in greater detail below, provides a number of features. Localization framework 200 is adaptable to existing or legacy code bases because the framework requires minimal or no localization-dedicated developer resources at start up, regardless of when it is implemented for a code base. Localization framework 200 can be implemented immediately after coding of an application, years after coding of the application, or after one or more application updates. Localization framework 200 scales for future languages to be supported by the application. Because of the manner in which the captured text strings are readied for translation, application developers need not be knowledgeable about localization. Developers do not need to know particularities of different languages nor be concerned with how the localization will occur. Developers are merely asked to follow basic rules to indicate gender-specific references within a text string (e.g., whether a user mentioned in the text string is a male or female) or possible numerical values referenced within a text string (e.g., whether a number value may be 0, 1, or many).

The capture feature of the framework provides automatic prioritization of text strings to be translated. Among other things, this decreases overall translation cost (not all of the text strings within an application may need to be translated), ensures timely translation of those text strings that are currently in use, and frees up developer time to focus on application rather than localization development. Inactive text strings are not translated unless and until they become active. One way to provide automatic translation prioritization of text strings is to keep track of the number of times each text string is presented to users.

Because a smaller subset of text strings within an application requires translation at any given time, translation load at any given time is reduced. Depending on the availability of human translators, text strings sent for translation may be translated within a day. This means that within a day of displaying default text instead of translated text to users, all subsequent displays of that text string will be properly translated text. Even when the framework is initially implemented for an application, the translation load (e.g., the number of text strings sent for translation) rapidly decreases in a short period of time to reach a steady state. Assuming the number of translators stay constant, translation turn-around gets faster the longer the framework is implemented for the application.

Capturing the text strings to be translated during actual user interaction with the application aids in providing translation context for those text strings. For example, merely extracting dynamic text strings—text strings in which one or more words within the text string is dynamically determined and inserted based on actual user interaction—from the codebase is inadequate to provide full context for translation. In framework 200, actual user interaction at application runtime is used to configure full translation context for the text strings to be sent for translation.

The Mafia Wars game by Zynga, Inc. is an example application that benefits from this localization framework. Among other things, Mafia Wars runs mostly on PHP Hypertext Preprocessor (PHP) code base for which there is no mature internationalization framework. Mafia Wars generates a large amount of text in the course of providing the game to users. The code base contains tens of thousands of unique text strings; thousands of token items that can be substituted into placeholders in the text strings; and millions of users, each with a unique name that is similarly substituted into placeholders in the text strings to provide personalized text to users. Mafia Wars is currently offered in seven foreign languages, with the ability to add more languages with ease. Given the multi-million user base and large amount of text displayed to each user in the course of game play, Mafia Wars localizes millions of words. Mafia Wars is also frequently updated, sometimes more than once a day, and it consistently attracts new users, thereby continually increasing the localization load. Thus, Mafia Wars and other applications with significant localization requirements benefit from a continuous localization process as provided by the localization framework discussed herein.

Consequently, when an application is initially put into production supporting a new language, all or a high volume of text strings are captured for translation because all of the accessed text strings are being accessed for the first time. This in turn creates an initial high translation workload. However, the translation workload tapers off (e.g., within a few weeks) because of the cumulative efficiencies inherent in the capture feature of the localization framework. As an example, for Mafia Wars, the initial translation workload for a major feature or release is several tens of thousands of text strings per day. The translation load then steadily decreases within a few weeks to a steady state volume that is orders of magnitude smaller than the initial translation workload. The initial translation workload for a minor feature or release may start at a hundred to several thousand text strings per day, and then steadily decrease to a steady state volume that is similarly orders of magnitude smaller than the initial translation workload. Note that fluctuations in translation workload are exacerbated for dynamic text stings, depending, among other things, on the number of tokens within the dynamic text strings to be translated or the number of variations of a given dynamic text string submitted for translation.

Figure 3:
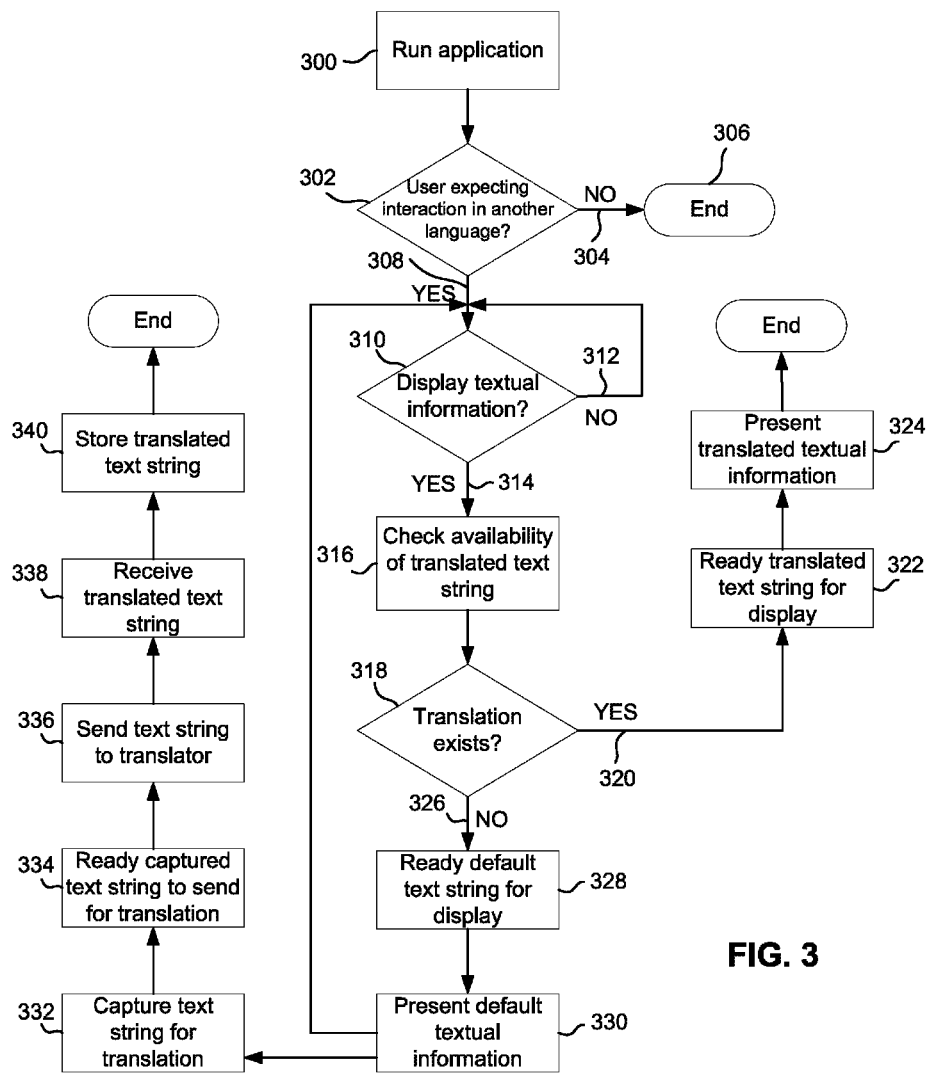
FIG. 3 illustrates a flow diagram for localization of an application in accordance with the localization framework of FIG. 2.
Figure 4:
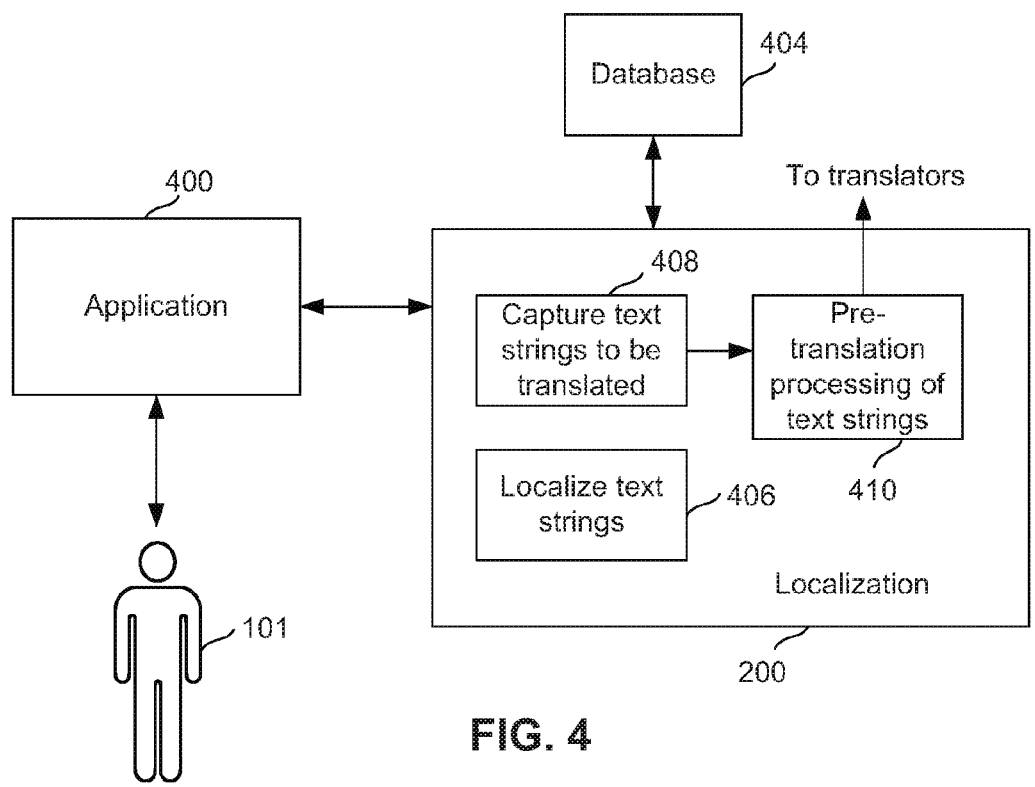
FIG. 4 illustrates a block diagram of additional details of the localization framework of FIG. 2.

FIG. 3 illustrates a flow diagram for localization of an application in accordance with localization framework 200 according to some embodiments. FIG. 4 illustrates a block diagram of additional details of localization framework 200 according to some embodiments. FIG. 3 will be described in conjunction with FIG. 4. Localization framework 200 may be hosted on dedicated or shared server machines as the application (e.g., application 400) that is communicatively coupled to enable communications between server machines. The application 400 and localization framework 200 themselves are communicatively coupled (e.g., via appropriate interfaces) to each other and to various data sources, so as to allow information to be passed between them or so as to allow sharing and access to common data. The application 400 and framework 200 may furthermore access one or more databases 404. FIG. 4 shows modules 406, 408, 410 within localization framework 200 to carry out the localization discussed below. Alternatively, one or more of modules 406, 408, 410 may be included in the code base of the application itself to facilitate localization. The decision to include localization functionalities within the application, provide with a set of instructions distinct from the application, or something in between are various implementation details encompassed and contemplated by the embodiments discussed herein.

When a user (e.g., player 101) accesses an application (e.g., application 400), an instance of the application begins at block 300. Depending on the configuration of the application, the user may be required to provide verification information (e.g., login and password) in order to continue with the application. Such verification information may be associated with user profile information previously collected or provided by the user. For example, a user-preferred language may be specified in the user profile information. Alternatively, the user may access a particular language version of the application. In still another alternative, the application may be able to determine the user-preferred language from the user's IP address, cookies, or user selection at application runtime. In any case, a determination is made as to whether information to be displayed to the user should be in a language other than the default language (block 302).

If a different language is not required (no branch 304), then localization is not required for that instance of the application (block 306). Otherwise a different language from the default language is required (yes branch 308). As the user interacts with the application, if a point is reached at which information, particularly textual information, is to be presented to the user (block 310), the information is localized so that it may be presented in the proper language (yes branch 314). Textual information (also referred to as text) comprises one or more letters including, but not limited to, words, phrases, sentences, numbers, static text, dynamic text, menu items, icons, commands, messages, instructions, or other language-based information conveyed to the user. Textual information is specified in the application code by text strings (also referred to as strings). Otherwise the wait continues for a display event (no branch 312).

Next at blocks 316 and 318, the application communicates with the localization framework to check for availability of a translated text string corresponding to the text string to be displayed to the user. As an example, the application can include a GetText function to obtain the appropriate translated text string. The GetText function checks a translated properties file for a key value pair. If a key value corresponding to the text string to be displayed exists, the key value is used to retrieve the translated text string. If no key value and/or translated text string is found, then a default text string (e.g., the text string in English) is used. The application and the localization framework interact with each other using application program interface (API), function calls, or the like.

A localize module 406 (see FIG. 4) communicates with database 404 to check availability of the translated text string. In alternative embodiments, database 404 may be included in the server that provides the localization framework 200. If the translated text string exists (yes branch 320), then the translated text string is readied for presentation to the user (block 322). In the case of the text string being a dynamic text string, it includes text as well as one or more tokens. A token (also referred to as a token type) is a placeholder within the text string to be replaced by a particular word(s) depending on user interaction during runtime. An example of a dynamic text string is: "%NAME% just won the %ITEM% for completing the %JOB%job." In that text string, tokens NAME, ITEM, and JOB are replaced with, for example, the user's name "Bill," the item "star," and the job "remodeling," respectively. Note that depending on the language to localize, database 404 may store more than one version of the translated text string. Part of localizing includes selection of the proper version of the text string depending on the tokens to be substituted with real words. Certain languages may have grammar rules requiring different translation of the non-token portions of the dynamic text strings depending on the words replacing the tokens. For example, Spanish has gender-based grammar while Turkish does not. In the case of static text strings (e.g., text string with no tokens), different translation versions are unnecessary.

In one embodiment, the text string to be localized (also called a localizable text strings) is run through a localizability checker script and uploaded to a translation management tool (e.g., XTM). The text string is analyzed to see how closely it matches previously translated text strings stored in database 404. If the text string is very similar or identical to previously translated material with only one or more of the tokens changed, then the existing translation may be reused without requiring new translation.

Once the desired translated text string is found within database 404, any tokens remaining within the translated text string are replaced with words in accordance with the user interaction with the application (e.g., user's current game situation) to complete conversion of the original text string to the appropriate text string. In one embodiment, localize module 406 may return the translated text string to the application before substitution of remaining token(s) within the translated text string. The application performs the token substitution. Alternatively, localize module 406 may return the translated text string to the application after token substitution has been completed.

The localized text string is then displayed to the user in block 324. In displaying the localized text string to the user, cultural concerns or legal restrictions particular to the translated language, but not necessarily applicable for the default language, are also taken into account. For example, there may be sensitivity to use of color, visual elements, minimal font size laws, right to left text orientation, and the like.

If the translated text string does not exist in database 404 (no branch 326), then localization comprises providing the textual information in the default language coded in the application. For example, the text strings in the application code may be in English—the default language—while the user expects interaction in Russian. In the case of dynamic text string, tokens within the text string are replaced with words in accordance with the user's actual interaction with the application. Then the default or non-translated text string is displayed to the user (block 330). In certain embodiments, even though the text string is not translated, cultural concerns or legal restrictions associated with the new language may be taken into account.

In accordance with localization framework 200, the absence of a translated text string (in the desired translated language) in database 404 triggers a capture module 408 to capture the text string for translation (block 332). Continuing the example of the GetText function, capture may comprise extracting the text string(s) within the GetText function, identifying those text string(s) for which no translation exists in database 404, and saving those text strings to an (external) file. The captured text strings are then readied for translation by readying module 410 (block 334). Although FIG. 3 shows blocks 328-330 occurring before blocks 332-340, blocks 328-330 can be performed simultaneously with or after blocks 332-340.

Readying module 410 performs a number of functions to ready or "wrap" the text strings for translation. In order to streamline the localization process, the text strings within the application can be written in such a way as to assist localization developers, translators, cut down on localization costs, and ensure the stability of the code base and database. Text strings written according to the following guidelines, while not exhaustive, facilitates translation:

Express a complete thought in a complete and grammatically correct sentence: If the original text string itself is an incomplete sentence or is grammatically incorrect, then translation of that text string is more likely to be incomplete or incorrect.
  Avoid being wordy: Translations from English tend to be 130 to 200% longer than in English.
  Avoid ambiguous words: For example, a "boxer" may be a person who boxes or a type of dog.
  Avoid use of abbreviations and special characters: Abbreviations and special characters are not universal and make translation difficult.
  Avoid text strings contained within images if possible: Consider a text overlay over an image, rather than text embedded within an image, because localizing strings contained in images takes more effort.
  For a list of items, consider using a colon: For example, instead of a text string "You need cement blocks, power tools, and slot machines to complete this job," restructure it to a list of items using a colon, "You need the following items to complete this job: cement blocks, power tools, slot machines."

When a text string that has not being previously translated is evoked by a user for the first time, the easiest way to ready it for translation is to just capture it and send it as is to a human translator to translate. This method, however, leads to inaccurate translations of dynamic text strings. Instead, localization framework 200 substitutes one or more tokens included in the dynamic text string and includes instructions, as appropriate, so that translators can correctly translate the text string. This means that a single text string can be readied as a set of text strings to cover language-dependent variations. All such variations may be stored (perhaps in database 404) to send for translation.

In one embodiment, all tokens within a text string may be replaced with actual words except for a name token type. For example, the captured text string is:

"%NAME% won a %ITEM% and %NUM% bonus %POINTS% for completing the %JOB% job."

The corresponding readied text strings saved for translation may be:

"%NAME% won a Bunny and 0 bonus points for completing the sales job."
  "%NAME% won a Bunny and 1 bonus point for completing the sales job."
  "%NAME% won a Bunny and 2 bonus points for completing the sales job."

Instruction: %NAME% can be a female name or a male name. %POINTS% can be "point" or "points."

The readying schema above ensures correct translations of languages dependent on different treatment of numerical values of 0, 1, and more than one, as well as those languages with gender-specific grammar.

In another embodiment, only certain types of tokens within a text string may be replaced with actual words. This approach tends to reduce the number of translated text string entries in database 404. For example, the normal token type, which is a default token type that can be items, properties, cities, or other undefined token types, are replaced, while the number token type, name/user token type, or formatting token type are left as is.

In an alternative embodiment, the normal token type and number token type may be replaced within the text string. The number token type may be substituted to ensure that translators correctly translate for languages dependent on different treatment of the values of 0, 1, and more than one.

In another alternative embodiment, the localization developer may balance the number of strings to be translated (i.e., increased translation cost and turnaround time) against the accuracy of the returned translation for all possible words that may replace the tokens within a text string.

Selectively replacing token(s) within the text string with actual words prior to translation provides translators better context for performing accurate translations. Providing complete sentences to translators, instead of phrases or single words, also provides better context for accurate translations.

Note that once a text string within the application code is captured for translation in a particular language (e.g., Spanish), readying module 410 may proactively prepare the text string for translation in other languages supported by the application (e.g., French, Italian, German, Portuguese, Indonesian, and Turkish). Readying module 410 may additionally prepare the text string for translation in a language that will be supported by the application in the near future. In other words, any user in any supported language that accesses a particular text string within the application code for the first time can initiate translation of that text string not only in the user-desired language but also in one or more languages (present or future) supported by that application. Being proactive in this manner significantly reduces the rollout time for a newly supported language.

Moreover, if there are known statistics about the difference in application usage between different language users (e.g., Spanish users versus Turkish users), such data can be used to determine if a particular text string to be translated in a first language should also be translated in a second or additional language. For example, if Turkish users do not access a portion of the application that is accessed by Spanish users, there is no need to translate those text strings into Turkish (until a Turkish user actually accesses that portion of the application and requires display of those text strings).

Whether a text string is readied for translation in a first and second language at the same time or at different points in time, the readied text string(s) for each respective language may be different from each other, depending on particularities of the respective languages. If, for example, a particular language does not have numerical value dependent variability, there is no need to provide different versions of the text string for numerical values of 0, 1, and many.

Next, the readied text strings are sent to human translators in block 336. Each captured text string is readied for translation as discussed above, and they are accumulated for a day or some other time period. Depending on the volume of readied text strings or desired turnaround time those text strings are sent for translation.

The completed translations are accordingly received by the system (block 338) and stored in database 404 (block 340). Translations are stored within database 404 according to known organization and access schemes. For example, the translated text strings may be accessible according to a list or table scheme. Prior to storage in database 404, the translations are checked one or more times for accuracy and completeness. For example, translations from human translators are edited by human editors. As another example, translations are run through post-processing scripts to ensure that no tokens have been disturbed during translation or that no English text (when English is the default language) is left in the translated text. Once post processed, the resulting .po file may be uploaded to database 404.

Blocks 302-340 repeats, as needed during instantiation of an application, for successive textual information to be displayed in a language other than the default language to a user.

Figure 5:
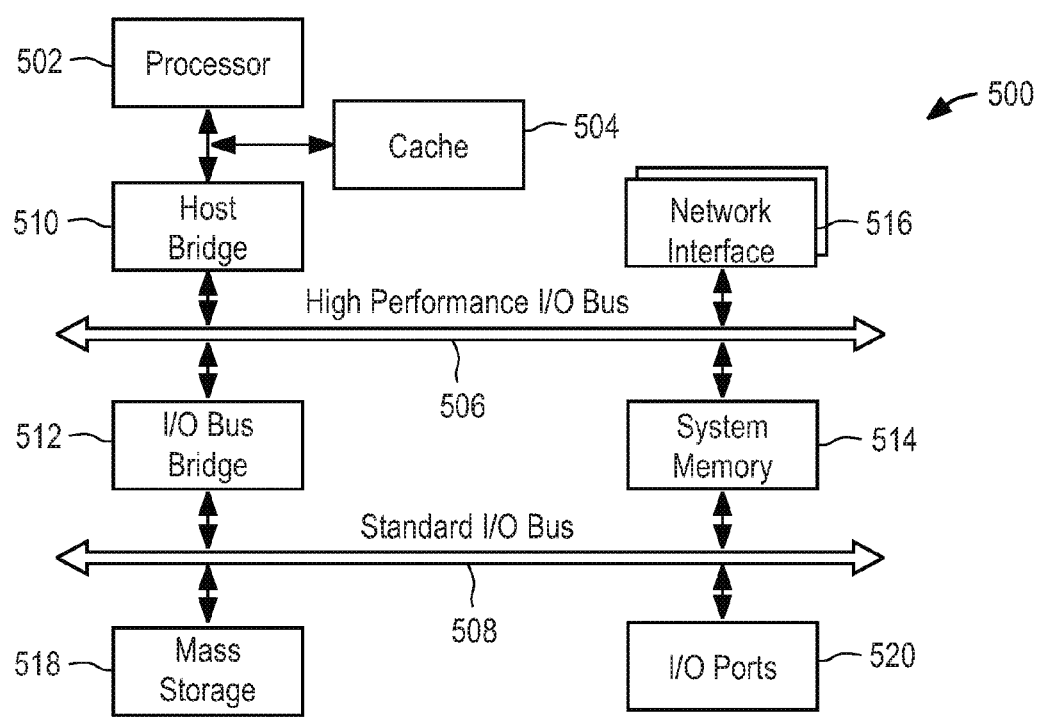
FIG. 5 illustrates an example computing system architecture, which may be used to implement various sub-systems included in the system of FIG. 1.

FIG. 5 illustrates an example computing system architecture, which may be used to implement a social or game networking system 120a, 120b, a client system 130, or a server including localization framework 200. In one embodiment, hardware system 500 comprises a processor 502, a cache memory 504, and one or more executable modules and drivers, stored on a tangible computer readable medium, directed to the functions described herein. Additionally, hardware system 500 may include a high performance input/output (I/O) bus 506 and a standard I/O bus 508. A host bridge 510 may couple processor 502 to high performance I/O bus 506, whereas I/O bus bridge 512 couples the two buses 506 and 508 to each other. A system memory 514 and one or more network/communication interfaces 516 may couple to bus 506. Hardware system 500 may further include video memory (not shown) and a display device coupled to the video memory. Mass storage 518 and I/O ports 520 may couple to bus 508. Hardware system 500 may optionally include a keyboard, a pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in servers, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present disclosure may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

In this manner, a localization framework that automatically identifies the current text strings within an application for translation is disclosed herein. The localization framework further provides pre-translation processing of text strings to facilitate accurate translations. Among other things, selective token substitutions within text strings, text strings comprising complete sentences, and variations of a given text string are generated, when necessary, to provide context and remove possible ambiguity in the text strings to be translated. Because the localization process works on a continual basis, it is able to handle legacy code base as well as updates to the code base.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
    based at least in part on a user interaction with a game application that is executed on a client device, identifying a text string in the game application;
    receiving, from a server separate from the client device, a translation of the identified text string, the translation of the identified text string including a token;
    in an automated operation performed using one or more computer processor devices, substituting the token with a word in accordance with the user interaction with the game application, thereby providing an updated translation of the text string; and causing display of the updated translation of the text string on the client device.

2. The method of claim 1, wherein the text string includes a further token; and the method further comprises:
substituting the further token in the text string with a further word, the substitution being performed in accordance with a language structure of a target language, thereby providing a second text string; and
prior to receiving the translation of the identified text string, sending the second text string to the separate server for translation of the second text string into the target language.

3. The method of claim 2, further comprising:
receiving, from the server separate from the client device, a translation of the second text string; and
causing display of the translation of the second text string on the client device.

4. The method of claim 2, further comprising storing the translation of the second text string in a database.

5. The method of claim 2, further comprising determining that all words in the translation of the second text suing are in the target language.

6. The method of claim 1; wherein the receiving the translation of the identified text string includes retrieving the translation of the identified text string from a database.

7. The method of claim 1, wherein:
the translation of the identified text string is also a translation of a previous text string; and
the method further comprises determining that the identified text string and the previous text string are identical.

8. The method of claim 1, further comprising identifying the translation of the identified text string by determining that a key value corresponding to the identified text string is available, the determination being performed prior to receiving the translation of the identified text string from the separate server.

9. The method of claim 1, further comprising:
receiving a user selection of a target language; and
determining that the identified text string is expressed in a default language that is different than the target language.

10. The method of claim 1; wherein the text string includes a dynamic text string.

11. A system comprising:
one or more processors and executable instructions accessible on a computer-readable medium that, when executed, configure the one or more processors to at least:
based at least in part on a user interaction with a game application that is executed on a client device, identify a text string in the game application;
receive, from a server separate from the client device, a translation of the identified text string, the translation of the identified text string including a token;
substitute the token with a word in accordance with the user interaction with the game application, thereby providing an updated translation of the text string; and
cause display of the updated translation of the text string on the client device.

12. The system of claim 11, wherein the text string includes a further token; and
the one or more processors are further configured to:
substitute the further token in the text string with a further word, the substitution being performed in accordance with a language structure of a target language, thereby providing a second text string; and
prior to receiving the translation of the identified text string, send the second text string to the separate server for translation of the second text string into the target language.

13. The system of claim 12, wherein the one or more processors are further configured to:
receive, from the server separate from the client device, a translation of the second text string; and
cause display of the translation of the second text string on the client device.

14. The system of claim 12, wherein the one or more processors are further configured to store the translation of the second text string in a database.

15. The system of claim 12, wherein the one or more processors are further configured to determine that all words in the translation of the second text string are in the target language.

16. The system of claim 11, wherein the one or more processors are further configured to retrieve the translation of the identified text string from a database.

17. The system of claim 11, wherein:
the translation of the identified text string is also a translation of a previous text string; and
the one or more processors are further configured to determine that the identified text string and the previous text string are identical.

18. The system of claim 11, wherein the one or more processors are further configured to determine that a key value corresponding to the identified text string is available, the determination being performed prior to receiving the translation of the identified text string from the separate server.

19. The system of claim 11, wherein the one or more processors are further configured to:
receive a user selection of a target language; and
determine that the identified text string is expressed in a default language that is different than the target language.

20. A non-transitory machine-readable medium storing instructions that, when executed by one or more processors of a machine, cause the machine to perform operations comprising:
based at least in part on a user interaction with a game application that is executed on a client device, identifying a text string in the game application;
receiving, from a server separate from the client device, a translation of the identified text string, the translation of the identified text string including a token;
substituting the token with a word in accordance with the user interaction with the game application, thereby providing an updated translation of the text string; and
causing display of the updated translation of the text string on the client device.

* * * * *

UNITED STATES PATENT AND TRADEMARK OFFICE
CERTIFICATE OF CORRECTION

| | | |
|---|---|---|
| PATENT NO. | : 9,442,924 B2 | Page 1 of 1 |
| APPLICATION NO. | : 14/974768 | |
| DATED | : September 13, 2016 | |
| INVENTOR(S) | : Lui et al. | |

It is certified that error appears in the above-identified patent and that said Letters Patent is hereby corrected as shown below:

In the Specification

In Column 3, Line 57, delete "interface" and insert --Interface--, therefor

In Column 3, Line 59, delete "interoperability" and insert --Interoperability--, therefor In Column 4, Line 6, before "system 130,", insert --client--

In Column 8, Line 40, delete "%JOB%job.""" and insert --%JOB% job."--, therefor

In Column 11, Line 29, delete "time" and insert --time,--, therefor

In Column 12, Line 7, after "(AMD)," insert --Inc.,--

In the Claims

In Column 15, Line 22, in Claim 5, delete "suing" and insert --string--, therefor In Column 15, Line 24, in Claim 6, delete "claim 1;" and insert --claim 1,--, therefor In Column 15, Line 44, in Claim 10, delete "claim 1;" and insert --claim 1,--, therefor Signed and Sealed this
Thirteenth Day of March, 2018

Andrei Iancu
*Director of the United States Patent and Trademark Office*